(12) United States Patent
McAinsh (10) Patent No.: US 8,398,107 B2
(45) Date of Patent: Mar. 19, 2013

(54) BICYCLE ANGLE ADJUSTMENT DEVICE FOR ROTATIONALLY ADJUSTING A FIRST BICYCLE PART IN RELATION TO A SECOND BICYCLE PART

(75) Inventor: Richard McAinsh, Villa d'Adda (IT)

(73) Assignee: 3T Design Limited, Central Hong Kong (HK)

( * ) Notice: Subject to any disclaimer, the term of this patent is extended or adjusted under 35 U.S.C. 154(b) by 175 days.

(21) Appl. No.: 12/746,051

(22) PCT Filed: Dec. 11, 2008

(86) PCT No.: PCT/IB2008/003435
§ 371 (c)(1),
(2), (4) Date: Jun. 3, 2010

(87) PCT Pub. No.: WO2009/077836
PCT Pub. Date: Jun. 25, 2009

(65) Prior Publication Data
US 2010/0270833 A1    Oct. 28, 2010

(30) Foreign Application Priority Data

Dec. 17, 2007  (NL) ..................................... 2001097
Mar. 13, 2008  (NL) ..................................... 2001372

(51) Int. Cl.
*B62K 21/14* (2006.01)
(52) U.S. Cl. ........ 280/278; 280/279; 280/280; 74/551.3
(58) Field of Classification Search .......... 280/278–280; 74/551.3
See application file for complete search history.

(56) References Cited

U.S. PATENT DOCUMENTS

| 657,290 | A | * | 9/1900 | Landis ........................ 74/551.5 |
| 2,484,551 | A | * | 10/1949 | Brouse ............................ 74/522 |
| 5,009,292 | A | * | 4/1991 | Hoffman et al. ............ 188/71.7 |
| 5,404,769 | A | * | 4/1995 | Kao .............................. 74/551.3 |
| 5,465,634 | A | * | 11/1995 | Chen ........................... 74/551.3 |
| 5,509,328 | A | * | 4/1996 | Lai .............................. 74/551.3 |

(Continued)

FOREIGN PATENT DOCUMENTS

DE  202005016338 U1   1/2001
EP    0 019 420 A1   11/1980

(Continued)

*Primary Examiner* — Kevin Hurley
*Assistant Examiner* — Michael Stabley
(74) *Attorney, Agent, or Firm* — Hoffmann & Baron, LLP (57) ABSTRACT

The bicycle angle adjustment device according to the invention is suitable for rotationally adjusting a first bicycle part in relation to a second bicycle part. The first bicycle part is provided with a hole with an internal toothing. Also, an intermediate ring is provided with an external and internal toothing, wherein the intermediate ring's external toothing, when 5 mounted, meshes into the internal toothing of the first bicycle part. In this way, a first set of meshing toothings is formed. The second bicycle part is provided with an external toothing which, when mounted, meshes into the internal toothing of the intermediate ring, in such a way that a second set of meshing toothings is formed. The first set of toothings has a first minimum angular rotation and the second set of toothings has a second minimum angular 0 rotation. The first minimum angular rotation of the first set of toothings differs from the second minimum angular rotation of the second set of toothings.

12 Claims, 9 Drawing Sheets

U.S. PATENT DOCUMENTS

| | | | |
|---|---|---|---|
| 5,515,744 A * | 5/1996 | Liao | 74/551.3 |
| 5,755,141 A * | 5/1998 | Chen | 74/551.3 |
| 5,779,253 A * | 7/1998 | Lee | 280/279 |
| 6,206,395 B1 * | 3/2001 | Young | 280/278 |
| 6,244,131 B1 * | 6/2001 | Liao | 74/551.3 |

FOREIGN PATENT DOCUMENTS

| | | |
|---|---|---|
| EP | 0 129 857 A1 | 1/1985 |
| EP | 0 764 575 A2 | 3/1997 |
| GB | 2 182 895 A | 5/1987 |

\* cited by examiner

BICYCLE ANGLE ADJUSTMENT DEVICE FOR ROTATIONALLY ADJUSTING A FIRST BICYCLE PART IN RELATION TO A SECOND BICYCLE PART

CROSS-REFERENCE TO RELATED APPLICATIONS

This application is the National Stage of International Application No. PCT/IB2008/003435, filed Dec. 11, 2008, which claims the benefit of Netherlands Application Nos. NL 2001097, filed Dec. 17, 2007, and NL 2001372, filed Mar. 13, 2008, the contents of which are incorporated by reference herein.

FIELD OF THE INVENTION

The present invention relates to a bicycle angle adjustment device for rotationally fine-adjusting a first bicycle part in relation to a second bicycle part.

BACKGROUND OF THE INVENTION

The first bicycle part could for instance be a handlebar that has to be rotationally coupled to a handlebar stem as second bicycle part, in a particular position. From prior art, we know of such bicycle angle adjustment devices, for instance from U.S. Pat. No. 5,404,769, wherein the handlebar can be mounted on the handlebar stem by means of a clamp with bolts. After loosening the bolts of the clamp, the handlebar can be rotated until the handlebar has reached the required angle setting. This concerns a fine-adjustment, wherein the handlebar is adjusted with a few degrees, e.g. 0.1°-5°. Then, the bolts of the clamp can be tightened again, so that the handlebar will keep its angle setting.

A disadvantage of such known bicycle angle adjustment devices, is that high clamping forces are required in order to keep the handlebar in position. In order to withstand the high clamping forces, the handlebar must have a strong construction at least locally, which will affect the weight of the complete handlebar. Clamping forces that are too high, could lead to damages to the handlebar. Clamping forces that are too low, could result in a decline of the angle setting while using the bicycle. Clamping forces that are too low, could also pose an additional risk to safety. Particularly, in case of huge physical exertion on the bicycle, there might be a risk that the handlebar rotates unexpectedly, which could lead to accidents. Obviously, this situation is not desirable.

U.S. Pat. No. 5,509,328 shows a handle bar adjusting construction which comprises a head tube with which a handle bar upright tube can be connected in various rotational positions by using a set of intermeshing teeth. For this the head tube comprises a central cut out at the sides of which lugs are provided. Each lug incorporates a square fitting hole. The handle bar upright tube comprises a fitting hole with a serrated inner wall. An outer profiled intermediate ring is to be place inside the fitting hole. On its outer circumference this ring comprises twenty-six teeth which each lie at an angular distance of 14° of each other. The teeth make it possible to rotate the handle bar upright tube in steps of 14° relative to the intermediate ring and thus also relative to the head tube. Inside the ring a square hole is provided. This square hole is intended to have a form fit with a square mounting pin which, after it is mounted in its correct position into both the square fitting holes of the head tube and into the square hole of the intermediate ring, delimit this intermediate ring both in the axial direction sideways and in the rotational direction relative to the head tube.

A disadvantage with this construction is that only relative coarse rotational adjustments between the two bicycle parts can be obtained, in particular of 14°, 28°, 42°, etc.

The bicycle angle adjustment device can also be used as a saddle adjustment device. In case of such an application, the first bicycle part could for instance be a saddle pillar, and the second bicycle part could be a saddle that has to be rotationally coupled to a saddle pillar, in a particular position.

From prior art, we already know of a bicycle angle adjustment device used as a saddle adjustment device. Usually, by using the known saddle adjustment devices, a saddle with a saddle rail underneath it, can be adjusted in longitudinal direction. Moreover, the saddle adjustment device can be used to perform an angle setting. By means of the right longitudinal and angular settings, a saddle can be set optimally for a bicycle rider.

However, the known saddle adjustment devices often have the problem that the setting of the saddle in longitudinal direction and the angular setting decline after a while. Moreover, the longitudinal setting is often affected by setting the correct angle, and vice versa, the angular setting is often affected when the longitudinal setting of the saddle is adjusted. Clearly, this is not a desirable situation.

Generally, the bicycle angle adjustment device is used to couple bicycle parts, wherein a particular angular setting is required between the bicycle parts.

The present invention aims to eliminate at least one of the above-mentioned disadvantages at least partially, or to provide a usable alternative. In particular, the invention aims to provide a bicycle adjustment device that can be used as a handlebar angle adjustment device or as a saddle adjustment device, wherein the bicycle angle adjustment device is easy to use and wherein the angular and longitudinal setting can be reliably locked.

SUMMARY OF THE INVENTION

This object is achieved by means of a bicycle angle adjustment device according to the present invention.

The bicycle angle adjustment device according to the invention is suitable for rotationally adjusting a first bicycle part in relation to a second bicycle part. The first bicycle part is provided with a hole having an internal toothing. Also an intermediate ring is provided with an external and an internal toothing, wherein the external toothing of the intermediate ring, when mounted, meshes into the internal toothing of the first bicycle part. Herewith, a first set of meshing toothings is formed. The second bicycle part is provided with an external toothing which, when mounted, meshes into the internal toothing of the intermediate ring, in such a way that a second set of meshing toothings is formed. The first set of toothings has a first minimum angular rotation and the second set of toothings has a second minimum angular rotation. The minimum angular rotation of a set of toothings is defined by the angular rotation that is needed to rotate the toothings from a particular position of the toothings in relation to one another to a first possible next position, wherein the toothings mesh into each other. The first minimum angular rotation of the first set of toothings differs from the second minimum angular rotation of the second set of toothings. The difference between the first and the second minimum angular rotation is at least 0.05°. The difference between the first and the second minimum angular rotation is 20° at the most. The first minimum angular rotation, for instance, has a value of 9°. The second minimum angular rotation could have a value of, for example, 9.47°. By rotating the first set in a first direction and the second set of toothings in an opposite direction, it is possible to realize a total angular rotation of, for example, 0.47° through a differential effect. As a result, the saddle adjustment of the saddle by means of the saddle adjustment device according to the invention is accurate. Advantageously, an accurate angular setting can be obtained between 0.1° and 5°, in such a way that after a first rough adjustment, a further fine-adjustment can be obtained of the first bicycle part in relation to the second bicycle part.

Moreover, the angular setting is reliable through the application of toothings that mesh into each other. Decline of the angular setting is prevented in this way. Advantageously, the differential effect allows the toothings to be made relatively coarse, as a result of which a robust, strong construction is obtained in an advantageous way. The toothings of the bicycle angle adjustment device are relatively coarse compared to a bicycle angle adjustment device wherein an angular adjustment is made possible through one single set of meshing toothings. In a further preference, the first set of toothings has a minimum angular rotation of 360/40=9°, while the second set of toothings has a minimum angular rotation of 360/38=9.47°. This makes it possible to observe the requirements that are set for bicycles and, in particular, for professional racing bicycles.

In one embodiment of the intermediate ring according to the invention the number of teeth of the intermediate ring's internal toothing differs from the number of teeth of the intermediate ring's external toothing. Preferably, the difference in the number of teeth between the intermediate ring's external toothing and internal toothing is at least one. Even more preferably, the difference is at least two. Preferably, the internal and external toothing have 38 and 40 teeth respectively. Preferably, the teeth of the internal and external toothing extend in a longitudinal direction, i.e. in the direction of the central line, across the intermediate ring with teeth at both sides.

Preferably, the toothings are provided over the complete internal and external jacket surface of the intermediate ring.

In a preferred embodiment of the bicycle angle adjustment device according to the invention, the number of teeth of the external toothing of the intermediate ring is equal to the number of teeth of the internal toothing of the saddle pillar. Preferably, the number of teeth of the internal toothing of the first bicycle part corresponds with the number of teeth of the intermediate ring's external toothing, and the number of teeth of the external toothing of the second bicycle part corresponds with the number of teeth of the intermediate ring's internal toothing. Preferably, the toothings are provided over the full contour with a regular set of teeth having a fixed pitch. In an alternative embodiment, a toothing can be made with at least one or only some teeth along the contour. In an advantageous embodiment, the bicycle angle adjustment device is made as a saddle adjustment device for adjusting a saddle with saddle rail in relation to a saddle pillar. The saddle pillar should be considered as the first bicycle part with a continuous hole extending diagonally in relation to the longitudinal direction, provided with an internal toothing. The saddle is the second bicycle part. The saddle must be rotationally adjustable in relation to the saddle pillar. Also, the saddle can be translationally adjustable in relation to the saddle pillar. The saddle adjustment device has an intermediate ring provided with an external toothing, wherein the external toothing of the intermediate ring, when mounted, meshes into the internal toothing of the saddle pillar, in such a way that a first set of meshing toothings is formed. The intermediate ring also has an internal toothing. The saddle adjustment device further comprises a saddle rail support provided with an external toothing. When mounted, the toothing of the saddle rail support meshes into the internal toothing of the intermediate ring, in such a way that a second set of meshing toothings is formed. The first set of toothings has a first minimum angular rotation and the second set of toothings has a second minimum angular rotation. Advantageously, it is possible to make an accurate angular setting of the saddle in relation to the saddle pillar by means of the differential action described above, wherein the first minimum angular rotation differs from the second minimum angular rotation.

Another benefit of the saddle adjustment device according to the invention, is that the angular adjustment and the longitudinal adjustment of the saddle can be performed separately. The longitudinal adjustment takes place in relation to the saddle rail support that can be kept rotationally fixed in relation to the saddle pillar while adjusting the longitudinal direction. The angular adjustment of the saddle takes place by rotationally adjusting the saddle rail support in relation to the saddle pillar. Here, the saddle can remain permanently fixed to the rail in relation to the saddle rail support. As a result, the setting of the saddle in longitudinal direction is maintained while rotationally adjusting. In this way, it is possible to perform the saddle's angular adjustment and longitudinal adjustment independently.

Another important benefit, is that the meshing toothings avoid a decline of the saddle's set position. Due to the meshing toothings, the saddle's set position is more reliable. This strongly reduces the safety risks.

Moreover, it is also advantageous that the clamping forces of the locking means can remain limited or even be eliminated due to independent locking of the longitudinal and angular settings. In known saddle adjustment devices, where one locking means secures both the longitudinal setting and angular setting of a saddle, there is a risk of breakage of the saddle rail as a result of overtightening the lock. Due to independent locking of the longitudinal and angular adjustment, the clamping forces of the locking means can be kept limited, which reduces the risk of breakage of the saddle rail.

In a special embodiment of the saddle pillar according to the invention, the saddle pillar is provided with a bush with an internal toothing. The bush can, for instance, be pressed or glued in the saddle pillar. Preferably, the internal toothing of the bush will have at least 40 teeth.

In an advantageous embodiment of the saddle pillar, the saddle pillar is at least partly made out of a fiber-reinforced material, like carbon. As a result, the saddle will be light and rigid and extremely suitable for sports bicycles. Preferably, the bush with internal toothing is glued in the continuous hole of the saddle pillar.

In one embodiment according to the invention, the saddle rail support is provided with a continuous hole. The saddle rail support also comprises at least one support surface for supporting the saddle rail of the saddle. The support surface extends in a direction that is diagonal in relation to the centre line of the continuous hole. Substantially parallel to the support surface, a mounting flange is provided. The mounting flange is used for tightly connecting a rail clamp by means of a bolt. The mounting flange is provided with a hole through which a bolt can be inserted in order to tighten a rail clamp. Preferably, two mounting flanges are provided, in such a way that the rail clamp can be fixed with two bolts. However, it is also possible to use a hingeably mounted rail clamp. With one bolt, the rail clamp can be connected to the saddle rail support free from rotation, wherein the rail clamp can clamp a saddle rail that is located between the rail support and the rail clamp.

In a preferred embodiment of the rail clamp, the rail clamp has a mirror symmetrical shape in two perpendicular directions. Preferably, the rail clamp has a U shape, wherein the rail clamp is provided with continuous holes at the legs of the U shape. In these holes, shafts can be inserted with a transverse tapped hole. By screwing a bolt in the tapped hole from the mounting flange, the rail clamp can be pulled towards the mounting flange, as a result of which a saddle rail lying under the rail clamp is clamped.

The invention also concerns an assembly of a saddle with saddle adjustment device according to the invention.

The invention also concerns a handlebar angle adjustment device for rotationally setting a handlebar in relation to a handlebar stem. The handlebar angle adjustment device comprises a handlebar stem with a continuous hole extending diagonally in relation to the longitudinal direction, provided with an internal toothing. The handlebar angle adjustment device also comprises an intermediate ring provided with an external toothing. The external toothing of the intermediate ring, when mounted, meshes into the internal toothing of the handlebar stem, in such a way that a first set of meshing toothings is formed. The intermediate ring also has an internal toothing. Also, the handlebar angle adjustment device has a handlebar that is provided with an external toothing. When mounted, the handlebar's toothing meshes into the intermediate ring's internal toothing, in such a way that a second set of meshing toothings is formed. The first set of toothings has a first minimum angular rotation and the second set of toothings has a second minimum angular rotation. The first minimum angular rotation differs from the second minimum angular rotation. As already described above, the differential action advantageously allows an accurate and highly reliable rotational setting of the handlebar in relation to the handlebar stem. Because of the meshing toothings of the handlebar angle adjustment device, when mounted, the risk of decline of the angular setting is not or hardly possible.

The invention also relates to an assembly of a handlebar, a handlebar stem with handlebar angle adjustment device according to the invention.

The invention also relates to a bicycle provided with a bicycle angle adjustment device, such as a saddle adjustment device or handlebar angle adjustment device according to the invention, as well as to a method for operating the bicycle angle adjustment device.

Further preferred embodiments are recorded in the other sub-claims.

BRIEF DESCRIPTION OF THE DRAWINGS

The invention will be described in further detail by means of the included drawings that illustrate a practical usage of the invention, but which may not be regarded as a limitation, wherein.

DETAILED DESCRIPTION OF THE PREFERRED EMBODIMENTS

Figure 1:
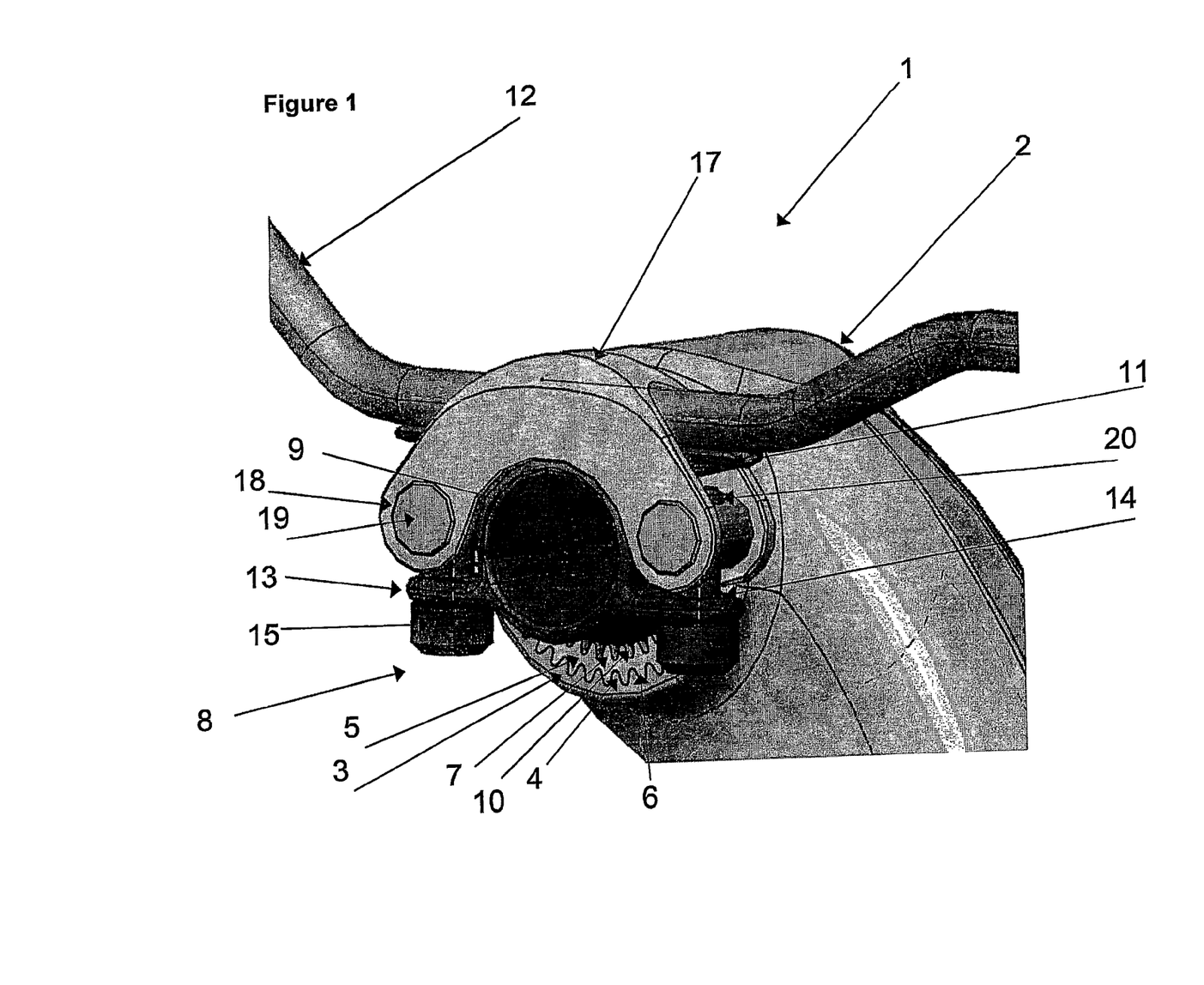
FIG. 1 shows a drawing in perspective of a preferred embodiment of a saddle adjustment device according to the invention.
Figure 2:
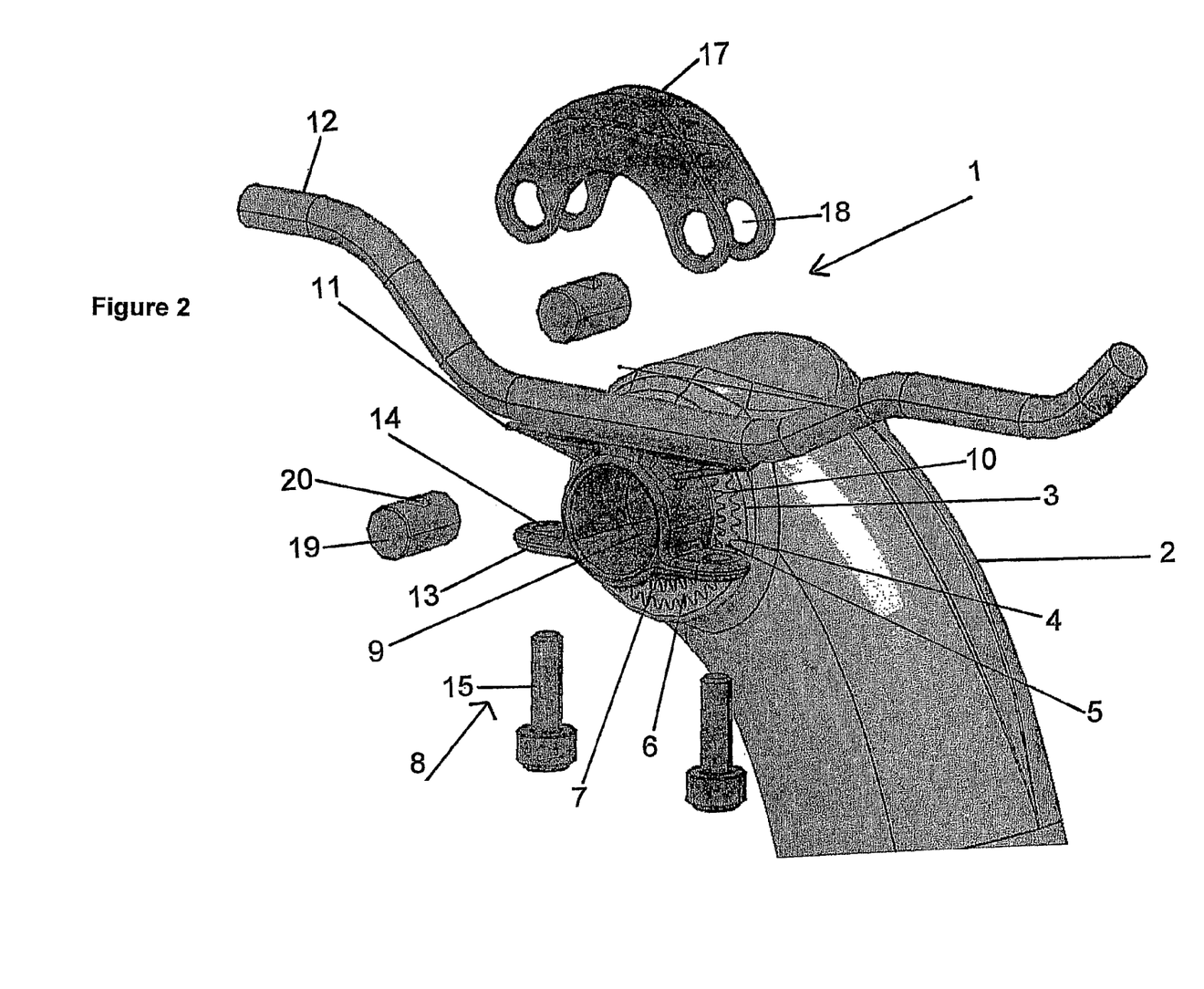
FIG. 2 shows a view corresponding with FIG. 1, with an exploded view of separate parts.

FIGS. 1 and 2 show a drawing in perspective and an exploded view of a preferred embodiment of a saddle adjustment device 1, comprising a saddle pillar 2, with an installed bush 3 provided with a toothing 4. This bush 3 with toothing 4 is used to adjust an angular setting of the saddle. In this bush 3, an intermediate ring 5 is provided, with an external toothing 6 and an internal toothing 7, wherein the external toothing is arranged in such a way that it works together with the toothing 4 of the bush 3 when setting the angle of the saddle. Additionally, FIG. 1 shows a saddle rail support 8, with a continuous hole 9 for fixing a mounting bolt (not shown), a saddle rail support toothing 10, and a support surface 11, on which the saddle rail 12 rests. Furthermore, the saddle rail support 8 comprises at least one mounting flange 13 having a continuous hole 14 for inserting a mounting bolt 15. For fixing a saddle rail 12 to support surface 11 a rail clamp 17 was used. The rail clamp 17 has a U shape, wherein the rail clamp is provided with continuous rail clamp holes 18 at the legs of the U shape. In the continuous rail clamp holes 18, shafts 19 can be inserted, both with a transverse tapped hole 20.

The parts with toothings are made in such a way that it is possible to adjust the angular setting of the saddle and the saddle clamp is made in such a way that it can give the saddle an increased or decreased forward or backward position, a so-called longitudinal setting.

In order to change the angular setting of the saddle, it is necessary to remove the mounting bolt (not shown) that is inserted in continuous hole 9. Then, the saddle rail support 8 can be removed from the intermediate ring 5 and the intermediate ring 5 can be removed from bush 3.

Bush 3 is fixed in the saddle pillar 2 and the toothing 4 of the bush 3 is made in such a way that it works together with the toothing 6 of the intermediate ring 5. The toothing 4 and the external toothing 6 of the intermediate ring 5 together form a first set of meshing toothings.

As the bush 3 is fixed in the saddle pillar 2, the toothing 4 is fixed as well. The bush 3 could, for instance, be glued in the saddle pillar. The fixation of the bush 3 in the saddle pillar is achieved by means of fastening means, like gluing or by means of a wringing fit. As a result, the bush 3 can be properly fixed in a saddle pillar made of carbon. This method of fixation of the bush is advantageous compared to a clamp connection with a bolt. The clamp connection with a bolt is accompanied by local clamping forces, resulting in locally occurring tightening peaks as a result of which the bush or the saddle pillar could collapse.

After removing intermediate ring 5 from bush 3, the intermediate ring 5 can be rotated over at least one or more angular positions in relation to the toothing 4, in other words, the intermediate ring 5 is rotated at least one tooth forwards or backwards. As the toothing 4 comprises forty teeth, the angular rotation of the intermediate ring when rotating one position forwards or backwards is 360/40=9°. The angular rotation can take place to the left or to the right, depending on the final result required by the user.

The intermediate ring 5 also has an internal toothing 7, which is arranged in such a way that it can work together with the toothing 10 of the saddle rail support 8. The internal toothing 7 of the intermediate ring 5 forms—together with the toothing 10 of the saddle rail support 8—a second set of meshing toothings. In order to change the angular setting of the saddle, the intermediate ring 5 can be rotated over at least one position in relation to the toothing 10 of the saddle rail support 8, in other words, the intermediate ring 5 is rotated forwards or backwards at least one position in relation to the toothing 10 of the saddle rail support 8. As the internal toothing 7 comprises thirty-eight teeth, the angular rotation when rotating intermediate ring 5 one position forwards or backwards, is 360/38=9.47°. The angular rotation of the second set of toothings can take place to the left or the right and the toothing can be rotated over at least one or more positions, depending on the final result required by the user.

Generally, an angular adjustment of at least 0.3° is required as fine adjustment, and to obtain this, the first set of meshing toothings should be rotated one position in relation to the home position. After this, the second set of meshing toothings should also be adjusted one position. However, this adjustment is in the opposite direction from the rotational direction of the adjustment of the first set of meshing toothings. If, for example, the first set of toothings is rotated to the left, the second set of toothings should be rotated to the right. If the first set of toothings is rotated one position to the left, an anti-clockwise angular rotation of 9° is realized. If the second set of toothings is now rotated one position to the right, there will be a clockwise angular rotation of 9.47°. A calculation indicates that the total angular rotation of the first and second sets of toothings amounts to 0.47°, clockwise.

When the user has determined the required angular setting of the saddle, the saddle should be fixed with the correct angular setting. For this purpose, intermediate ring 5 is inserted in the bush 3, wherein the intermediate ring 5 has been given the correct angular rotation. After this, the saddle rail support can be inserted again in intermediate ring 5, again with the required angular rotation. Finally, everything should be fastened by means of a mounting bolt (not shown) which is fixed in continuous hole 9. By applying this bolt, the intermediate ring 5 and saddle rail support 8 are fixed to saddle pillar 2, and a reliable permanent angular setting is realized.

For supporting the saddle and fixating and adjusting the saddle position in the longitudinal direction of the bicycle, i.e. moving the saddle more to the front or more to the back, a saddle rail support 8 is provided. This saddle rail support 8 comprises a continuous hole 9, a mounting bolt (not shown), a toothing 10 and a support surface 11. The saddle rail 12 is placed on a support surface 11 of the saddle rail support 8. The saddle rail 12 is fixed on the support surface 11 by means of a rail clamp 17. This rail clamp 17 comprises legs provided with continuous rail clamp holes 18, in which shafts 19 with a tapped hole 20 are provided.

For fastening and fixing the saddle rail to the saddle rail support, a fixing bolt 15 is mounted in the mounting flange 13. This fixing bolt 15 is tightly mounted in tapped hole 20 of the shaft 19. By firmly fastening the fixing bolt 15 in tapped hole 20, a secure fastening is created, as a result of which the saddle rail 12 can no longer slide up and down over support surface 10.

For adjusting a saddle in a more forward or backward position, the fixing bolt 15 should be loosened partly, at least in such a way that there is a certain amount of play between the rail clamp 17 and the saddle rail support 8, as a result of which it is possible to slide the saddle rail 12 more to the front or more to the back. When the required position of the saddle is reached, the fixing bolt 15 should be tightened again, so that it is fixed on the support surface 10 by means of the rail clamp 17 and the saddle rail 12.

From the previous description, it is clear that the angular setting of the saddle and the forward or backward position can be adjusted separately by means of the two different mechanisms. The first mechanism referred to is the mechanism with the toothings, by means of which the angular setting of the saddle can be set, independently of the forward or backward position of the saddle. The second mechanism is the mechanism by means of which the position of the saddle can be adjusted in longitudinal direction of the bicycle, independently of the angular setting of the saddle.

Figure 3:
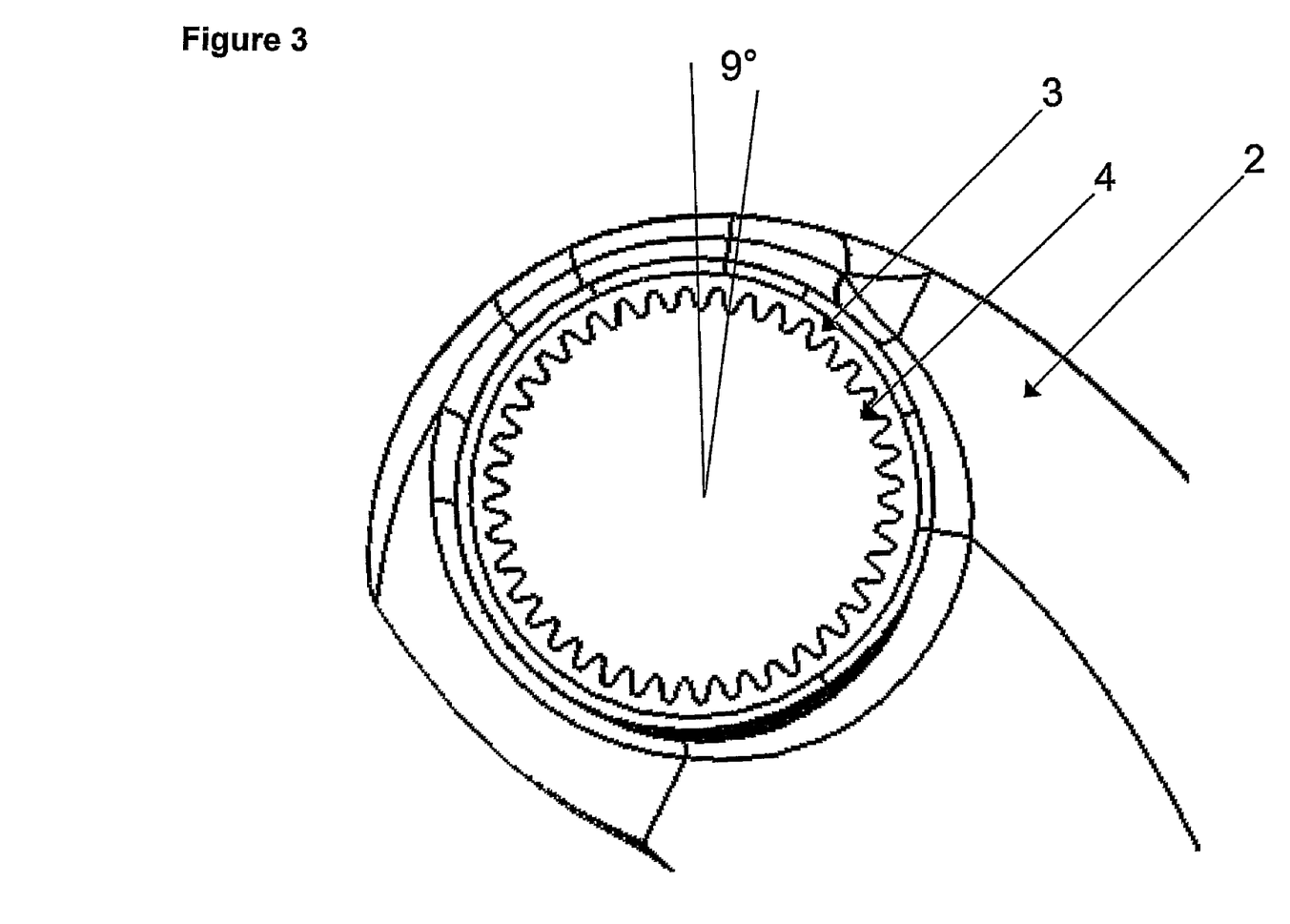
FIG. 3 shows a detail of a saddle pillar with a bush from a drawing in perspective of a preferred embodiment of a saddle adjustment device.

FIG. 3 shows a detail of a saddle pillar 2 with a bush 3 from a drawing in perspective of a preferred embodiment of a saddle adjustment device 1. An opening is provided in the saddle pillar, in which a bush 3 is placed. This bush 3 is provided with toothing 4. The toothing 4 comprises 40 teeth. As a result of this partition, rotating the toothing 4 will lead to an angular rotation of 9°, per rotation over a position. This toothing 4, together with the external toothing 6 of the intermediate ring 5, forms a first set of toothings.

Figure 4:
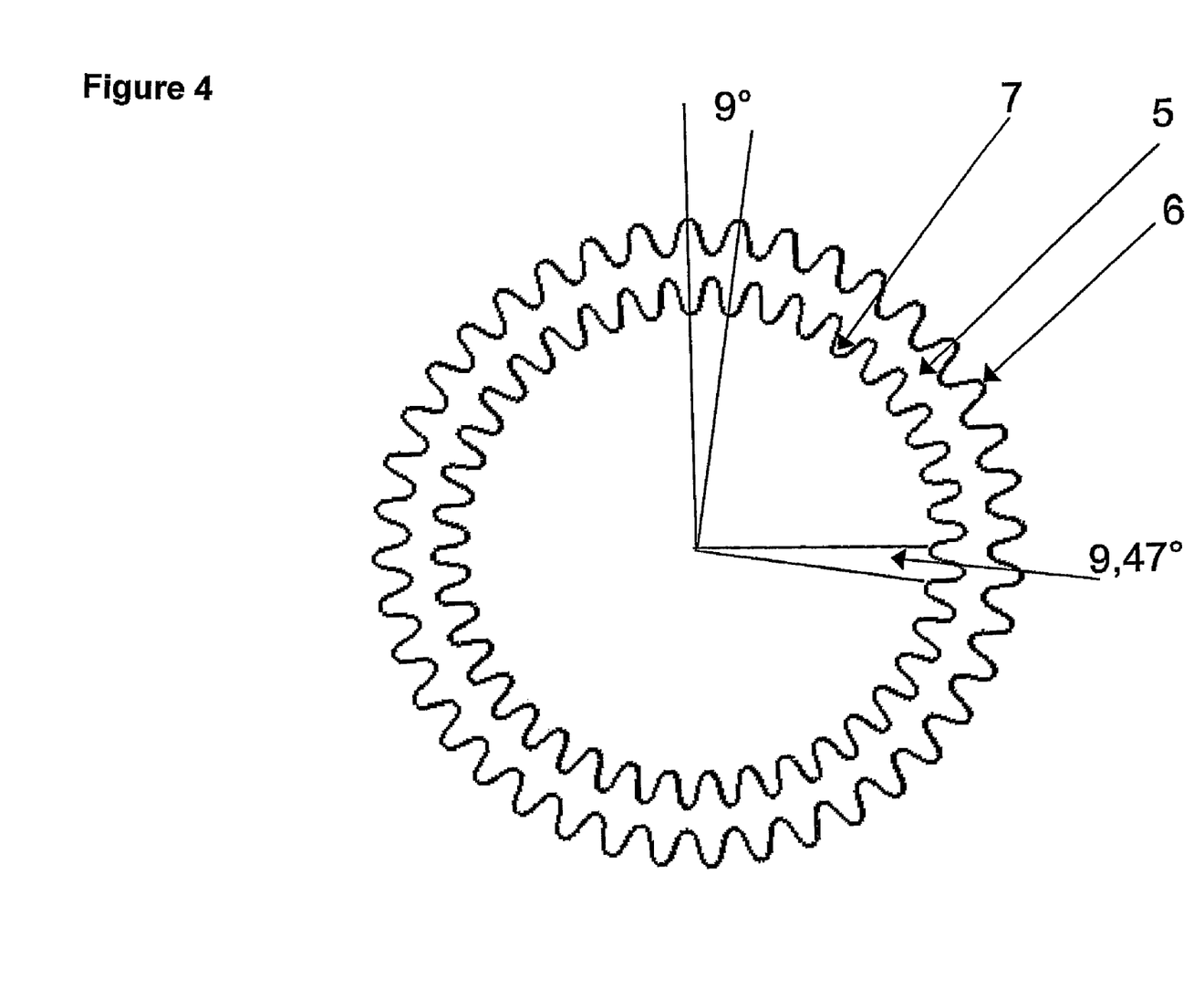
FIG. 4 shows a view in detail of an intermediate ring from a drawing in perspective of a preferred embodiment of a saddle adjustment device.

FIG. 4 shows a detail of an intermediate ring 5 from a drawing in perspective of a preferred embodiment of a saddle adjustment device 1. This intermediate ring 5 is provided with an external toothing 6 and an internal toothing 7. The external toothing 6 comprises 40 teeth. As a result of this partition, rotating the toothing 4 in relation to the external toothing 6, will yield an angular rotation of 9°, per rotation over a position. This toothing 4, together with the external toothing 6 of the intermediate ring 5, forms a first set of toothings. The internal toothing 7 comprises 38 teeth. As a result of this partition, rotating the toothing will yield an angular rotation of 9.47°, per rotation over a position. This toothing, together with the saddle rail support toothing 10, forms the second set of toothings.

Figure 5:
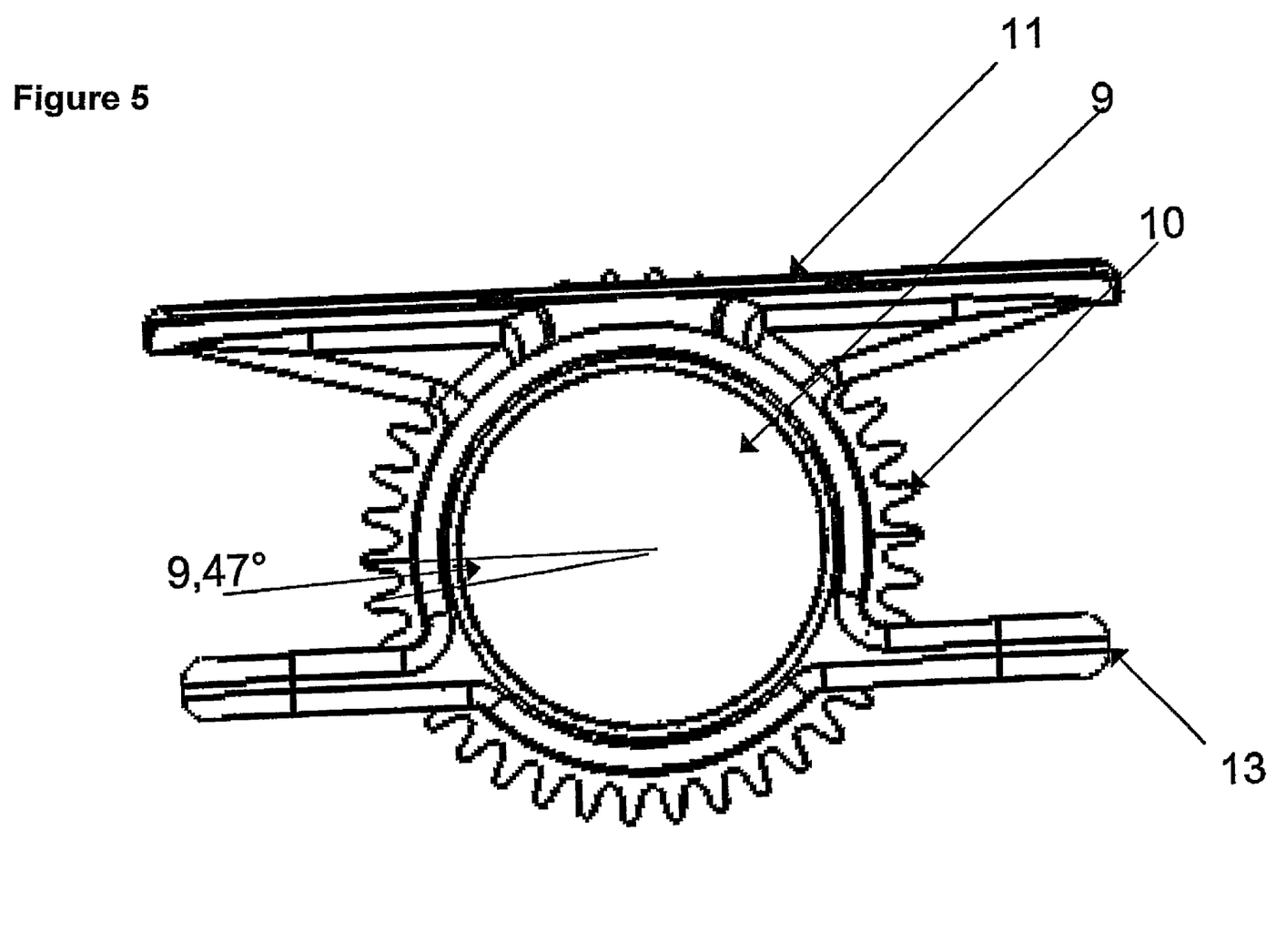
FIG. 5 shows a view in detail of a saddle rail support from the drawing in perspective of a saddle adjustment device.

FIG. 5 shows a detail of a saddle rail support from the drawing in perspective of a saddle adjustment device 1. The saddle rail support toothing 10 comprises 38 teeth. As a result of this partition, rotating the saddle rail support toothing 10 in relation to the internal toothing 7, will yield an angular rotation of 9.47°, per rotation over a position. This saddle rail support toothing 10, together with the internal toothing 7, forms the second set of toothings.

In an alternative embodiment, bush 3 with toothing 4 is an integral part of the saddle pillar 2.

In an alternative embodiment, one of the toothings of the first set of toothings could consist of less teeth. The toothing 4 of the bush 3 could, for instance, consist of at least one tooth, in such a way that the external toothing 6 is fixed by means of that one minimum tooth of the toothing 4 of bush 3.

In an alternative embodiment, one of the toothings of the first set of toothings could consist of less teeth. The external toothing 6 of the intermediate ring 5 could, for instance, consist of at least one tooth, in such a way that the toothing 4 of the bush is fixed by means of that one minimum tooth of the external toothing 6.

In an alternative embodiment, one of the toothings of the second set of toothings could consist of less teeth. The internal toothing 7 of the intermediate ring 5 could, for instance, consist of at least one tooth, in such a way that the saddle rail support toothing 10 is fixed by means of that one minimum tooth of the internal toothing 7.

In an alternative embodiment, one of the toothings of the saddle rail support 8 of the second set of toothings could consist of less teeth. The saddle rail support toothing 10 of the saddle rail support 8 could, for instance, consist of at least one tooth, in such a way that the internal toothing 7 is fixed by means of that one minimum tooth of the saddle rail support toothing 10.

Figure 6:
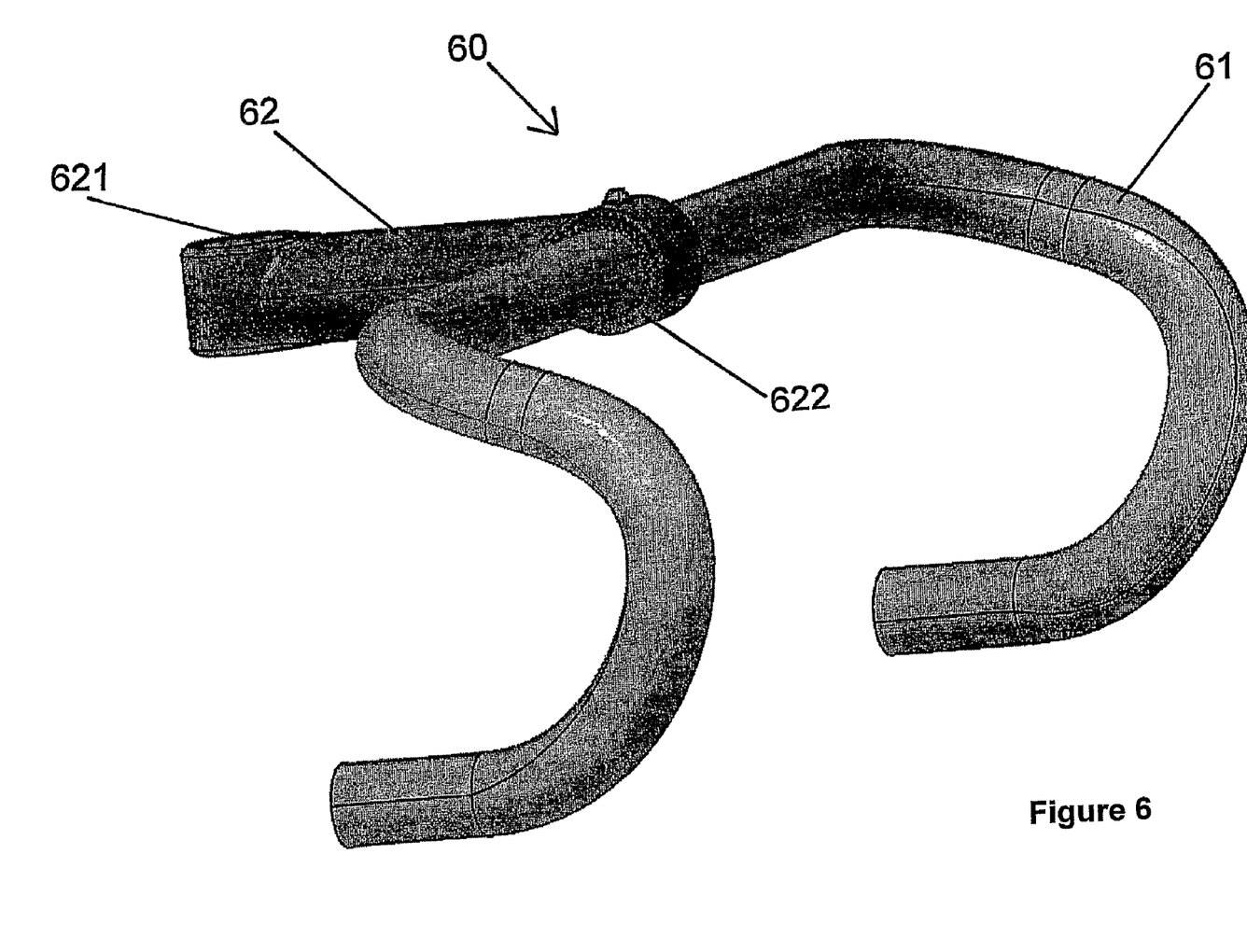
FIG. 6 is a view in perspective of a handlebar angle adjustment device according to the invention.

FIG. 6 shows a view in perspective of a bicycle angle adjustment device as handlebar angle adjustment device according to the invention. By means of the bicycle angle adjustment device 60, a handlebar is coupled to a handlebar stem 62. The handlebar 61 can be held by a user over its complete outer surface. In an area in the middle of the handlebar 61, the handlebar is coupled to the handlebar stem 62. The handlebar stem 62 is elongated and has a continuous hole 621 and 622 at both ends. The central lines of the continuous holes 621 and 622 are substantially perpendicular in relation to each other. Through the hole 621, the handlebar stem 62 can be mounted on a handlebar pillar of a bicycle. Through the hole 622, the handlebar 61 can be mounted on the handlebar stem 62.

Figure 7:
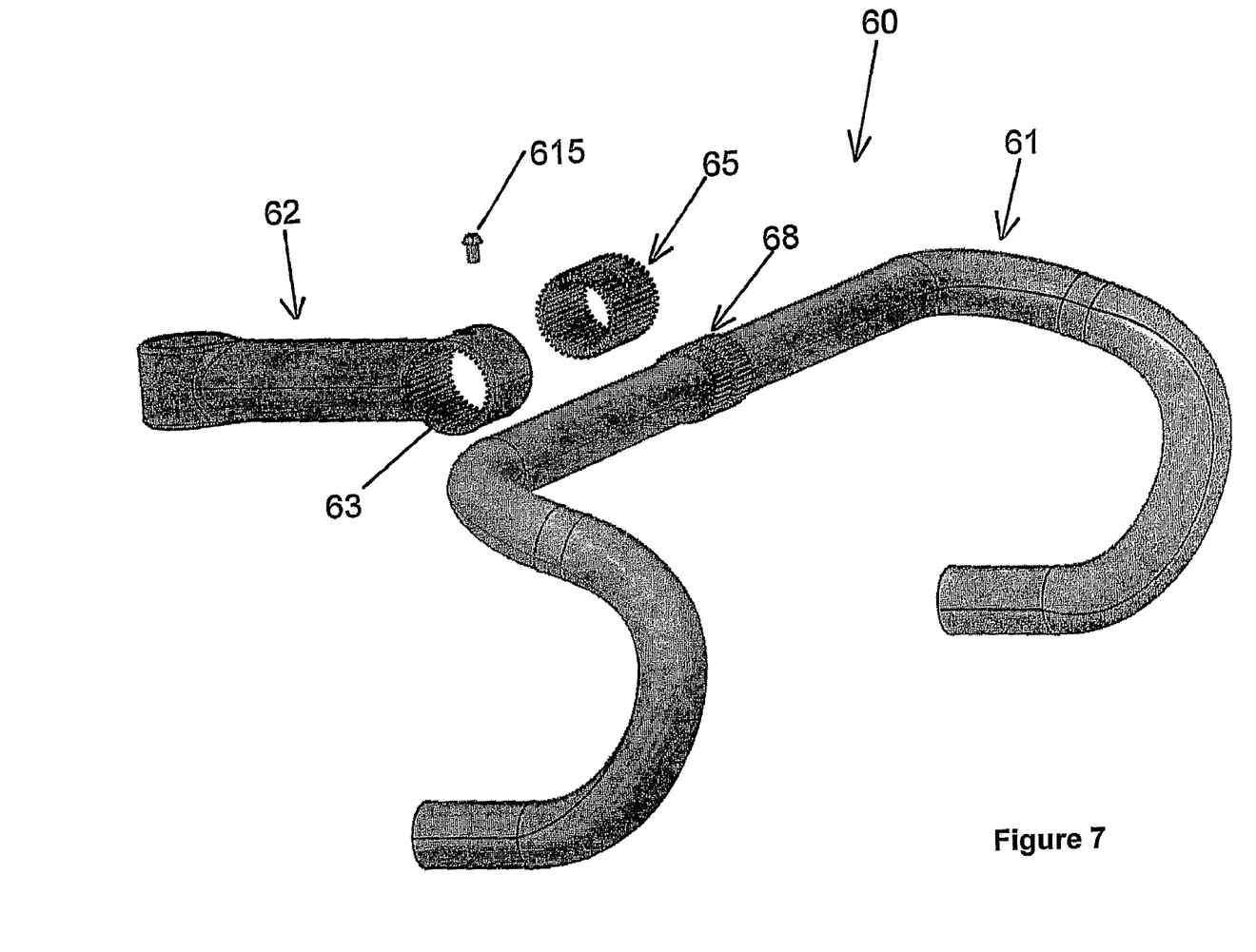
FIG. 7 is an enlarged representation of the handlebar angle adjustment device from FIG. 6.

FIG. 7 shows an enlarged view of the handlebar angle adjustment device 60 from FIG. 6. The handlebar angle adjustment device 60 is composed of a number of ring-shaped parts 63, 65 and 63 and a fixing bolt 615. Ring-shaped part 63 is a bush with an internal toothing that is permanently glued in the continuous hole 622 of the handlebar stem 62. The ring-shaped part 65 is an intermediate ring with an internal and external toothing. The intermediate ring can be loosened by loosening fixing bolt 615. The ring-shaped part 65 can be loosened in order to rotationally adjust the handlebar in relation to the handlebar stem 62. When the handlebar angle adjustment device is mounted, the external toothing of the intermediate ring meshes into the internal toothing of bush 63. This can be seen in the enlarged view in FIG. 8.

FIG. 7 also shows a ring-shaped part 68 that is permanently fixed to a central area of the handlebar 61. The ring-shaped part is a toothed ring 68 that is permanently glued to the handlebar 61. In circumferential direction, the intermediate ring 65 and the toothed ring 68 are provided with a groove. When mounted, the end (shank) of the fixing bolt extends into the groove of the toothed ring 68. When mounted, this makes sure that the intermediate ring 65 stays locked within the bicycle angle adjustment device according to the invention. In this way, the angular setting of the handlebar 61 in relation to the handlebar stem 62 is secured in a reliable way.

Figure 8:
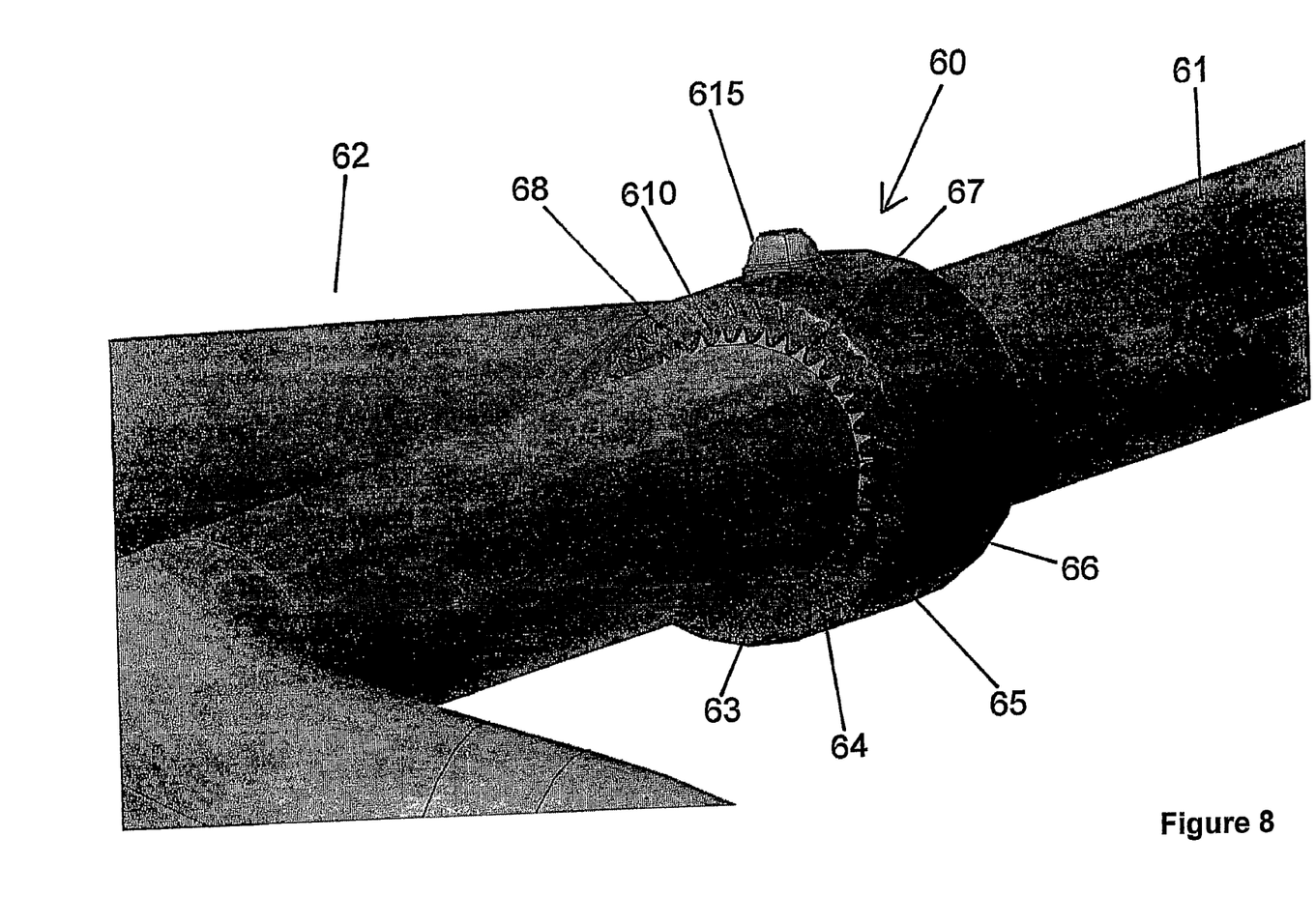
FIG. 8 shows a view in perspective of various parts, which together form the bicycle angle adjustment device according to this invention.

FIG. 8 shows a view in perspective of the various parts that, when mounted, together form the bicycle angle adjustment device according to the invention. The intermediate ring 65 is secured by means of the fixing bolt 615 in relation to the toothed ring 68 and the glued or clamped bush 63. Here—similar to the embodiment of the bicycle angle adjustment device as fine-adjustment of a saddle in relation to a saddle pillar, as shown in FIG. 1—the shown fixation with fixing bolt 615 can also advantageously prevent that local tensions occur in the bicycle parts, which could damage the bicycle parts. As a result, the bicycle angle adjustment device can particularly be beneficial for fastening and fine-adjusting carbon bicycle parts. The toothing 64 of the bush 63 in the handlebar stem 62 and the external toothing 66 of the intermediate ring 65 form a first set of toothings. The internal toothing 67 of the intermediate ring 65 forms, together with the external toothing 610 of the toothed ring 68 on the handlebar 61, a second set of meshing toothings.

Figure 9:
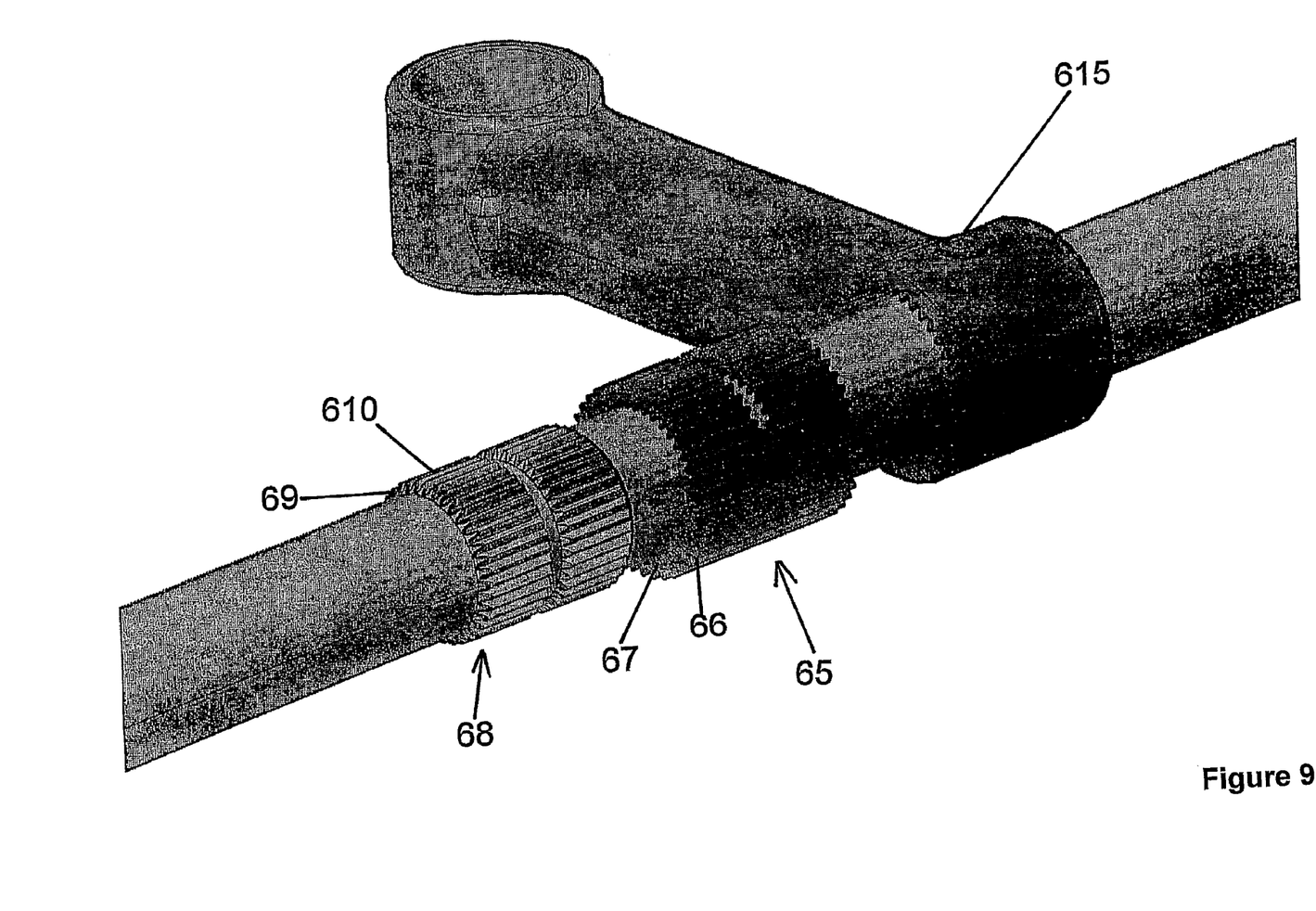
FIG. 9 shows a view in perspective of a dismantled assembly of a bicycle angle adjustment device as handlebar angle adjustment device according to the invention.

For more detail, FIG. 9 shows a view in perspective of a dismantled assembly of a bicycle angle adjustment device as handlebar angle adjustment device according to the invention. The reference numbers in FIG. 9 correspond with the respective reference numbers in FIG. 6-8. As shown in FIG. 9, two toothed rings 68 can be used instead of one toothed ring 68 with a groove in circumferential direction, wherein the toothed rings 68 are positioned with a certain mutual distance, in order to form a groove that can receive a shank of a fixing bolt.

In addition to the versions shown in the figures, many variations are possible that all fall within the protected range as defined in the claims. In an alternative embodiment of the saddle adjustment device it is, for instance, possible to leave out the adjustability of the saddle in longitudinal direction in relation to the saddle pillar, so that the saddle rail support can be permanently fixed to the saddle. Here, a saddle rail can be made as a fastening point. In an alternative embodiment, the toothed rings can be made substantially smooth instead of toothed over a part of the jacket surface.

Thus, a bicycle angle adjustment device has been provided according to the invention, which can be used for setting a wide variety of bicycle parts. Advantageously, the bicycle angle adjustment device can be adjusted accurately in order to comply with the requirements of bicycles concerning adjustability and there is hardly any risk of decline. Particularly advantageous in the bicycle angle adjustment device according to the invention, is that—through the absence of high clamping forces—more design freedom is achieved for bicycle parts that have to be adjusted in relation to each other. The bicycle parts can be made lighter and more rigid, wherein advanced materials like fiber-reinforced materials such as carbon and high-grade aluminium alloys can be used.

The invention claimed is:

1. A bicycle angle adjustment device for rotationally adjusting a first bicycle part in relation to a second bicycle part, wherein the first bicycle part is provided with a hole with an internal toothing;

an intermediate ring is provided with an external and an internal toothing, wherein the external toothing of the intermediate ring, when mounted, meshes into the internal toothing of the first bicycle part, in such a way that a first set of meshing toothings is formed; and the second bicycle part is provided with an external toothing, which, when mounted, meshes into the internal toothing of the intermediate ring, in such a way that a second set of meshing toothings is formed;

wherein the first set of toothings has a first minimum angular rotation and the second set of toothings has a second minimum angular rotation;

wherein the first minimum angular rotation differs from the second minimum angular rotation;

wherein the device is for rotationally fine-adjusting the first bicycle part in relation to the second bicycle part with a few degrees;

wherein the difference between the first and the second minimum angular rotation is 0.05° at the least and 20° at the most;

wherein the first bicycle part is a saddle pillar with a continuous hole extending transversally in relation to the longitudinal direction wherein the hole is provided with an internal toothing;

wherein the external toothing of the intermediate ring, when mounted, meshes into the internal toothing of the saddle pillar, in such a way that a first set of meshing toothings is formed and wherein furthermore a saddle rail support is provided with an external toothing; and wherein, when mounted, the toothing of the saddle rail support meshes into the internal toothing of the intermediate ring, in such a way that a second set of meshing toothings is formed.

2. The bicycle angle adjustment device according to claim 1, wherein the first minimum angular rotation is 360/40=9° and wherein the second minimum angular rotation is 360/38=9.47°.

3. The bicycle angle adjustment device according to claim 1, wherein the number of teeth of the intermediate ring's internal toothing differs from the number of teeth of the intermediate ring's external toothing.

4. The bicycle angle adjustment device according to claim 1, wherein the number of teeth of the intermediate ring's external toothing is equal to the number of teeth of the internal toothing of the first bicycle part.

5. The bicycle angle adjustment device according to claim 1, wherein the number of teeth of the second bicycle part corresponds with the number of teeth of the intermediate ring's internal toothing.

6. The bicycle angle adjustment device according to claim 1, wherein the saddle rail support is provided with at least one support surface for supporting a saddle rail.

7. The bicycle angle adjustment device according to claim 1, wherein a rail clamp for clamping the saddle rail of the saddle to the saddle rail support is provided for clamping, when mounted, the saddle rail to the saddle rail support.

8. An assembly of a saddle with bicycle angle adjustment device as saddle adjustment device according to claim 1.

9. A bicycle angle adjustment device for rotationally adjusting a first bicycle part in relation to a second bicycle part, wherein
the first bicycle part is provided with a hole with an internal toothing;
an intermediate ring is provided with an external and an internal toothing, wherein the external toothing of the intermediate ring, when mounted, meshes into the internal toothing of the first bicycle part, in such a way that a first set of meshing toothings is formed; and
the second bicycle part is provided with an external toothing, which, when mounted, meshes into the internal toothing of the intermediate ring, in such a way that a second set of meshing toothings is formed;
wherein the first set of toothings has a first minimum angular rotation and the second set of toothings has a second minimum angular rotation;
wherein the first minimum angular rotation differs from the second minimum angular rotation;
wherein the device is for rotationally fine-adjusting the first bicycle part in relation to the second bicycle part with a few degrees;
wherein the difference between the first and the second minimum angular rotation is 0.05° at the least and 20° at the most;
wherein the first bicycle part is a handlebar stem with a continuous hole extending transversally in relation to the longitudinal direction;
wherein the hole is provided with an internal toothing;
wherein the external toothing of the intermediate ring, when mounted, meshes into the internal toothing of the handlebar stem, in such a way that a first set of meshing toothings is formed and wherein furthermore a handlebar is provided with an external toothing; and
wherein, when mounted, the toothing of the handlebar meshes into the internal toothing of the intermediate ring, in such a way that a second set of meshing toothings is formed.

10. The bicycle angle adjustment device according to claim 9, wherein the intermediate ring comprises a groove in circumferential direction, for securing the bicycle angle adjustment device when mounted.

11. A bicycle provided with a bicycle angle adjustment device according to claim 9.

12. A method for rotationally fine-adjusting a first bicycle part in relation to a second bicycle part with a bicycle angle adjustment device comprising the steps:
providing a first bicycle part having a hole with an internal toothing;
providing an intermediate ring with an external and an internal toothing, wherein the external toothing of the intermediate ring, when mounted, meshes into the internal toothing of the first bicycle part, in such a way that a first set of meshing toothings is formed;
providing a second bicycle part with an external toothing, which, when mounted, meshes into the internal toothing of the intermediate ring, in such a way that a second set of meshing toothings is formed;
wherein the first set of toothings has a first minimum angular rotation and the second set of toothings has a second minimum angular rotation;
wherein the first minimum angular rotation differs from the second minimum angular rotation;
wherein the device is for rotationally fine-adjusting the first bicycle part in relation to the second bicycle part with a few degrees; and
wherein the difference between the first and the second minimum angular rotation is 0.1° at the least and 5° at the most;
rotating the first set of toothings in a first direction; and
rotating the second set of toothings in an opposite direction in order to obtain a minimum total angular rotation of between 0.1° at the least and 5° at the most.

* * * * *